(12) United States Patent
Smith

(10) Patent No.: US 8,459,443 B2
(45) Date of Patent: Jun. 11, 2013

(54) RECIRCULATION BIN FOR DRILL TAILINGS HAVING DEFLECTOR MEANS, AND A DRILL TAILINGS HANDLING APPARATUS

(76) Inventor: Donald R. Smith, Strathmore (CA)

( * ) Notice: Subject to any disclaimer, the term of this patent is extended or adjusted under 35 U.S.C. 154(b) by 177 days.

(21) Appl. No.: 13/150,980

(22) Filed: Jun. 1, 2011

(65) Prior Publication Data

US 2012/0305363 A1 Dec. 6, 2012

(51) Int. Cl.
*B65G 21/00* (2006.01)

(52) U.S. Cl.
USPC .................. 198/550.1; 198/550.01; 198/670

(58) Field of Classification Search
USPC ............ 198/550.1, 550.01, 360, 361, 370.01, 198/670, 671; 299/56; 175/66
See application file for complete search history.

(56) References Cited

U.S. PATENT DOCUMENTS

| 4,264,106 A * | 4/1981 | Deeter et al. .................... 299/56 |
| 4,804,148 A * | 2/1989 | Etheridge ....................... 241/35 |
| 6,440,312 B1 * | 8/2002 | Kasevich ................. 210/748.01 |
| 6,530,438 B1 * | 3/2003 | McIntyre ........................ 175/66 |
| 7,380,617 B1 | 6/2008 | James |
| 7,493,969 B2 | 2/2009 | Burnett et al. |
| 2007/0278012 A1 * | 12/2007 | Smith ............................. 175/66 |
| 2008/0283301 A1 * | 11/2008 | Sherwood et al. ............. 175/206 |
| 2010/0193249 A1 * | 8/2010 | Saiz ................................ 175/66 |

* cited by examiner

*Primary Examiner* — James R Bidwell
(74) *Attorney, Agent, or Firm* — Vidas, Arrett & Steinkraus, P.A.

(57) ABSTRACT

A recirculation bin, a drill tailings handling apparatus, and a method of handling drill tailings is disclosed. The recirculation bin has a moveable plate member, which advantageously may be positioned, when excess tailings are being delivered to the recirculation bin, to deflect such excess tailings into a second containment bin, for subsequent re-delivery to the recirculation bin when capacity to process such drill tailings is then available. The handling apparatus contemplates a second container, which is disposed immediately adjacent the recirculation bin, to receive deflected tailings, and is open at one end thereof to permit entry of a front-end loader therein, and thereby permit excess tailings deflected into the second container to be scooped up and delivered to the recirculation bin, when the moveable plate member is positioned to then allow the recirculation bin to accept such delivery, at a time when processing capability for such drill tailings is available. A method for handling drill tailings is further disclosed.

20 Claims, 12 Drawing Sheets

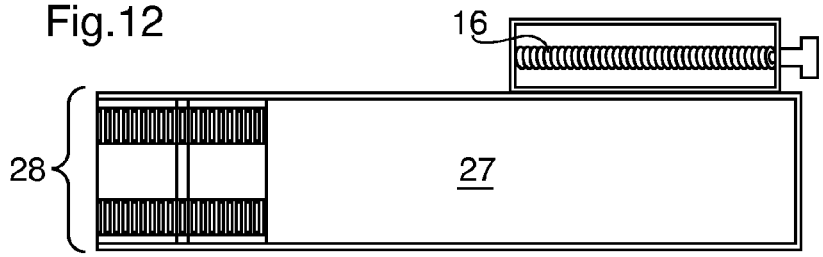
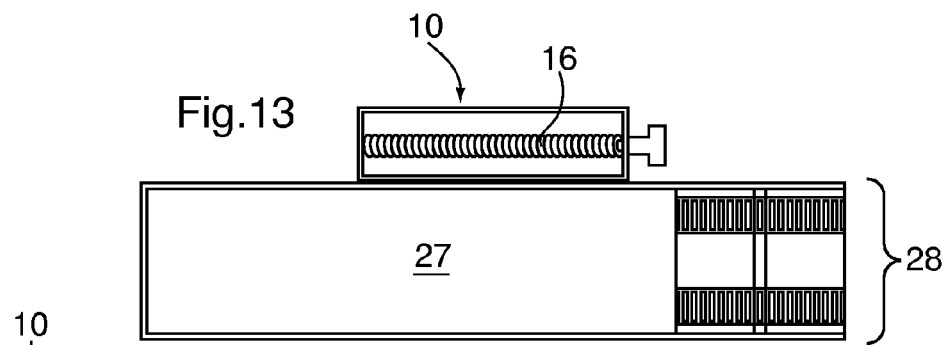
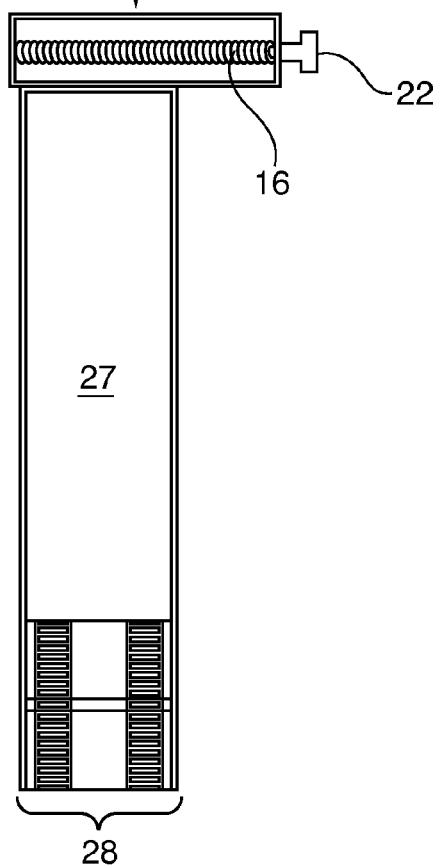

US 8,459,443 B2

RECIRCULATION BIN FOR DRILL TAILINGS HAVING DEFLECTOR MEANS, AND A DRILL TAILINGS HANDLING APPARATUS

FIELD OF THE INVENTION

The invention relates to apparatus for handling drill cuttings or tailings, and more particularly to a tailings handling and containment apparatus useful in drill tailings cleaning operations, having deflector means to handle overflow conditions.

BACKGROUND OF THE INVENTION AND DESCRIPTION OF THE PRIOR ART

Drill tailings and cuttings covered with drilling mud and/or oil and which emanate from an oil derrick, are typically conveyed from the drilling derrick via shaker tables or powered conveyor belts to an interim recirculation bin or temporary storage vessel, prior to being supplied to tailings cleaning apparatus mounted on portable skids.

Due to highway load carrying restrictions [currently for some roads a tri-axle limitation of 55,000 pounds (21,653 kg) for trucks which transport tailings equipment cleaning apparatus to a drill site], the size of recirculation bins and as well the tailings cleaning skids (which possess such cleaning equipment as centrifuges or conical cyclone separators) is typically limited due to such load restriction placed on such trucks, as to is the size of such equipment which can be transported on such trucks. Accordingly, due to the necessary compact size of such equipment, the processing capacity of such equipment is often seriously limited.

Frequently, when rapidly drilling, or when entering a "pay" zone where oil is encountered, a drilling derrick may for a relatively short period of time generate a large quantity of drill tailings and/or tailings which may be very "dirty" or oily.

In such circumstances, the capacity of a recirculation bin and associated cleaning equipment to rapidly handle and clean a deluge of dirty tailings becomes seriously compromised and may, at least temporarily, be exceeded.

In such circumstances, in order to allow the tailings cleaning equipment to "catch up", such requires drilling to be temporarily halted.

Halting of drilling operations, even for temporary periods, is extremely undesirable, as it results in additional expenses to the well owner considering that drilling operations are typically conducted by rented service rigs, all of which are rented at daily rates. In addition, time may be a factor, considering that drilling operations are typically conducted during winter, when transporting equipment to a site can be done over frozen ground, and removing such equipment from a site need be done before spring thaw.

Accordingly, for the above reasons, stoppage of drilling operations on an operative drilling rig is extremely undesirable.

SUMMARY OF THE INVENTION

In order to overcome the problems of the prior art where temporary stoppage of drilling operations is presently necessary where cleaning equipment becomes temporarily overwhelmed in capacity, and to provide a recirculation bin and tailing handling system adapted to handle "overflow" conditions with respect to drill cuttings and tailings being directed to such recirculation bin and thereby allow continuous drilling, in a first aspect of the present invention such invention comprises a recirculation bin for drill tailings which is useful and particularly adapted for use in a drill tailings handling apparatus of the present invention for handling temporary "overflow" conditions and allowing drilling to continue without stoppage.

In this regard, a recirculation bin of the present invention comprises:

(i) a container for drill tailings comprising a bottom wall and side walls;

(ii) helical auger means, situated in an interior of said container proximate said bottom wall and substantially spanning a lower region of said interior of said container, adapted for transporting tailings which settle in said lower region of said container out of said container; and (iii) a moveble plate member, slidably engaged with or pivotably coupled to said container, moveable from a first position for diverting tailings, to a second position allowing tailings to enter said interior of said container.

In a broader aspect of the present invention, the invention more broadly relates to a drill tailings handling apparatus, which allows continued drilling despite temporary "overflow" conditions, which makes use of the above recirculation bin.

Accordingly, in this further broader aspect of the invention, the invention comprises an apparatus for handling drill cuttings during cleaning operations, comprising:

(i) a first rectangular container for receiving drill tailings, comprising a bottom wall and side walls;

(ii) helical auger means, situated in an interior of said first container proximate said bottom wall and substantially spanning a lower region of said interior of said first container, adapted for transporting tailings which settle in said lower region of said first container out of said container;

(iii) a moveble plate member, slidably engaged with or pivotably coupled to said first container, moveable from a first position for deflecting and diverting tailings, to a second position allowing tailings to enter said interior of said first container; and (iv) a second rectangular container, positionable adjacent said first container, adapted to receive drill tailings from said first container which have been deflected by said moveable plate member when said first container is full or is unable to deliver said drill tailings at a sufficient rate to downstream processing equipment;

wherein said second container is open at one end thereof to allow entry of a front-end loader vehicle therein; and wherein said moveable plate member is moveable from said first position in which it directs and/or deflects drill tailings to said second container, to said second position so as to allow said first container to receive and retain drill cuttings that are delivered to said first container.

The second rectangular container is typically (although not necessarily) larger than the recirculation bin, and may be assembled from various sub-components which may be individually transported by truck. This is typically not the case in respect of the recirculation bin, which as noted above, is typically assembled with a screw-type auger located in the bottom thereof and which is not conducive to easy dis-assembly, and thus is typically of a smaller size than the second container which may be easily assembled into a large containment vessel from smaller transportable sub-components.

In operation, in an "overflow" where drill tailings are being delivered to the recirculation bin for temporary storage (for subsequent delivery to skid-mounted tailings cleaning equipment) and the cleaning capacity of the tailings cleaning equipment is temporarily insufficient to keep up with the rate of "dirty" tailings being delivered from the recirculation bin, moveable plate members as noted above on the recirculation bin may be positioned to temporarily deflect tailings which otherwise would have been delivered to the recirculation bin (and thus to the cleaning equipment) to the adjacent second container. Upon the resumption of the ability of the recirculation bin and associated drillings cleaning equipment to then further process (ie clean) such tailings, a front-end loader may enter one end of the second container, scoop up the diverted tailings, and re-supply them to the recirculation bin, which can then deliver such tailings to the tailings cleaning equipment.

Accordingly, in another aspect of the present invention, such invention comprises a method for cleaning drill tailings from an oil well being drilled, comprising delivering said tailings to a recirculation bin for subsequent delivery to, and cleaning by, cleaning apparatus, wherein if said cleaning apparatus has adequate capacity to receive tailings from said recirculation bin, then operating a deflector plate on said recirculation bin to permit additional tailings to be delivered to such recirculation bin/holding bin; and wherein if the cleaning apparatus has inadequate capacity to receive tailings from said recirculation bin, then operating said deflector plate to cause tailings that are being delivered to said recirculation bin to be deflected and instead be directed to an adjacent second container.

The tailings delivered to the second container, in a preferred embodiment where the second container is open at one end to allow access by a front-end loader vehicle, may then be delivered at a later time (when the capacity of the cleaning equipment is no longer exceeded) by the front end loader to the recirculation bin for subsequent cleaning.

With regard to recirculation bin, the moveable plate member thereof is preferably moveable from the first position, namely a closed position for preventing said tailings from entering the interior of the container and diverting said tailings away from said container to the adjacent second container, to the second position being an open position allowing tailings to enter said interior of said container.

In a first embodiment the moveable plate member is slideably moveable along top edges of said container, from said first position, to said second position. In a preferred embodiment, powered means, such as hydraulic cylinder(s) or electrically operated chain or belt drives, may further be used to effect the slidable movement of the plate member in the manner above-described.

In an alternative embodiment with regard to the recirculation bin and moveable plate member, the moveable plate member is pivotably coupled to the container, and is pivotably moveable from said first position, to the second position. In a preferred embodiment of this further refinement, the plate member has an axis of rotation passing through a centre of gravity of said plate member; and the plate member is rotatably pivotable about such axis of rotation.

Preferably, in all embodiments, the moveable plate member is inclined and sloped.

In a further refinement of the recirculation bin of the present invention, such receptacle bin has a substantially rectangular-shaped top surface, and the plate member spans substantially a width of said top surface but only a fraction of a length of said top surface, and preferably only ½ of the length of the top surface.

The recirculation bin preferably in all embodiments has at least one of the bottom or side walls having an inclined surface which extends from an upper region to a lower region of said container, and the inclined surface is adapted to ensure tailings within said recirculation bin which fall or slide from said upper region to said lower region by gravity along the inclined surface are directed toward said auger means, for subsequent delivery to tailings cleaning equipment. Preferably a side wall, or a front wall, or both, has an inwardly-inclined surface which is inwardly inclined from an upper region to a lower region of said container, to ensure tailings within said recirculation bin which fall or slide from said upper region to said lower region by gravity are directed toward said auger means.

In a further embodiment of the recirculation bin of the present invention, such may possess two slidable plate members, a first upper plate member having an inclined surface adapted, when said plate member is in said first position, to diverts tailings from one side of said container to another. A second lower plate member may further be provided, which has an inclined surface, inclined along a slop disposed 90° to the first slidable plate member, which is adapted to direct any tailings which may fall thereon away from the recirculation bin, and when a second containment bin (container) is placed in juxtaposed relationship with the recirculation bin, to direct such tailings into such second container.

Accordingly, in yet a further refinement and embodiment of the recirculation bin apparatus of the present invention, such recirculation bin comprises:

(i) a first container for receiving drill tailings, comprising a bottom wall and side walls;

(ii) helical auger means, situated in an interior of said first container proximate said bottom wall and substantially spanning a lower region of said interior of said container, adapted for transporting tailings which settle in said lower region of said container out of said first container;

(iii) a first moveble plate member, slidably engaged with said first container, having an inclined surface, moveable from a first position for diverting tailings from a first side of said first container to a second side of said first container, to a second position for allowing tailings to enter said interior of said first container via said first side of said first container; and (iv) a second movable plate member, slidably engaged with said first container, having an inclined surface, slidable from a first position for diverting tailings from a first side of said first container away from said first container, and a second position for allowing tailings to enter said interior of said first container via said first side of said container.

BRIEF DESCRIPTION OF THE DRAWINGS

Further advantages and permutations and combinations of the invention will now appear from the above and from the following detailed description of the various particular embodiments of the invention taken together with the accompanying drawings, each of which are intended to be non-limiting, in which:

FIG. 12 is a schematic of the drill tailings apparatus of the present invention comprising the recirculation bin and the second container, showing a first configuration for placing the recirculation bin relative to a second container;

FIG. 13 is a schematic of an alternative arrangement of the drill tailings handling apparatus of the present invention, showing a second configuration for placing the recirculation bin relative to the second container; and FIG. 14 is a schematic of an alternative arrangement of the drill tailings handling apparatus of the present invention, showing a third configuration for placing the recirculation bin relative to the second container.

DETAILED DESCRIPTION OF PREFERRED EMBODIMENTS

In the present description, identical reference numbers for various components in each of the various figures are intended to depict similar components of similar function.

Figure 1:
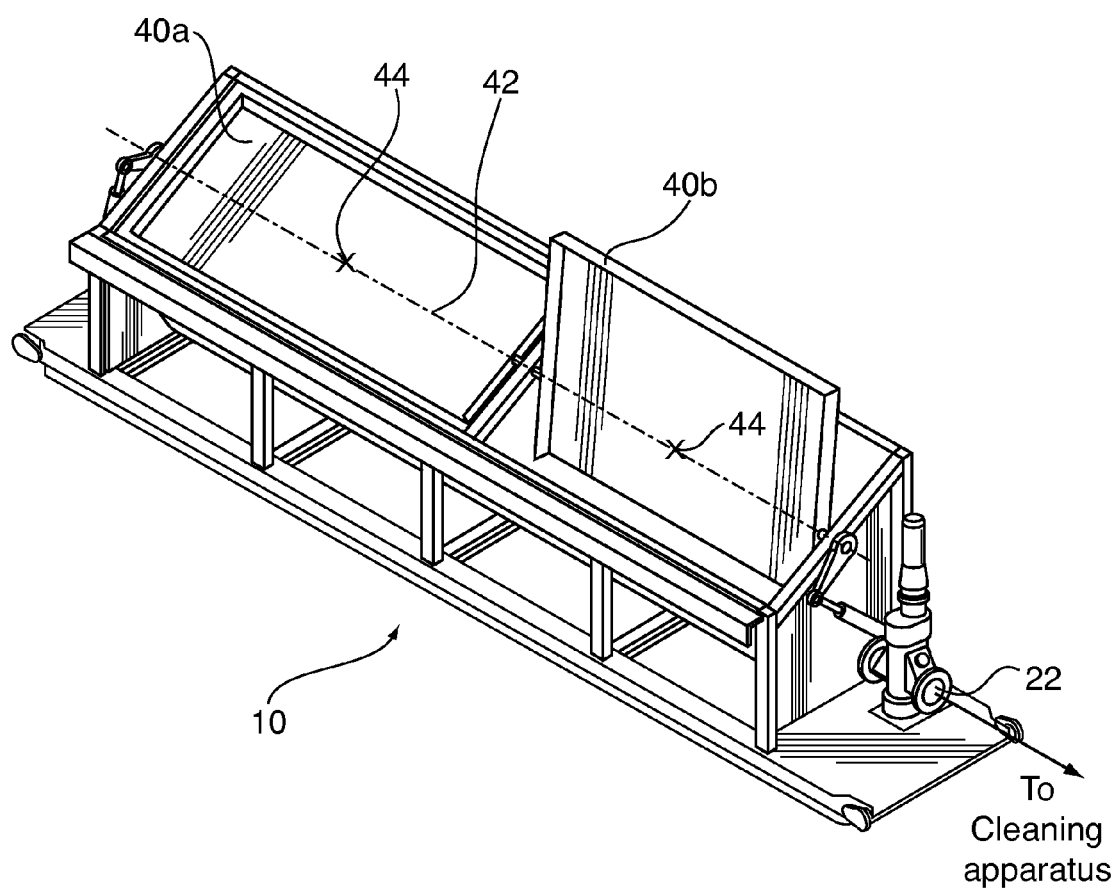
FIG. 1 is a perspective view of a first embodiment of the recirculation bin of the present invention, such recirculation bin having a pair of pivotable plate members which may act as deflector means for diverting flow of drilling tailings from, or allowing flow of drill tailings into, said recirculation bin.
Figure 2:
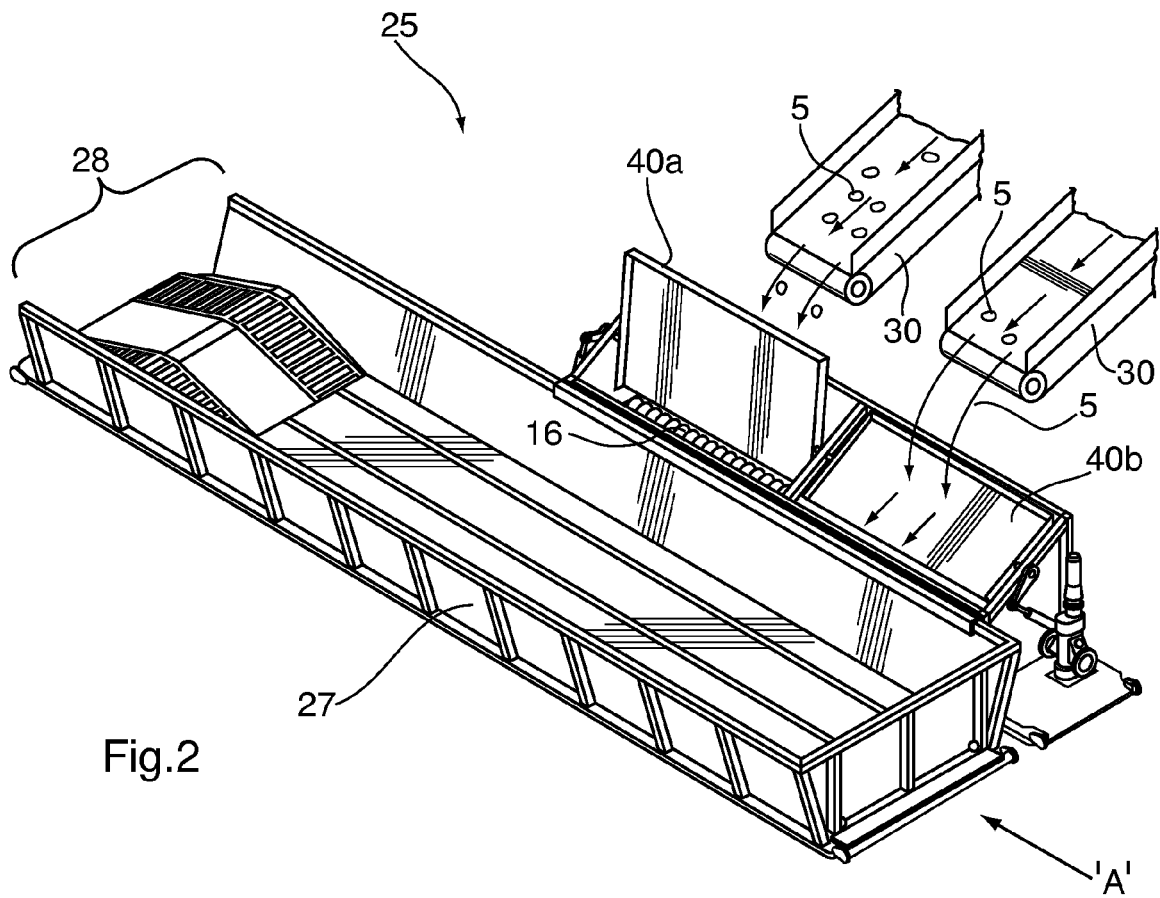
FIG. 2 is a perspective view of a drill tailings handling apparatus of the present invention, showing the recirculation bin of FIG. 1 having two deflector plates, with the receptacle bin operatively disposed to receive drill tailings from two shaker conveyors, and situated adjacent a second container accessible at one end by a front-end loader.

FIG. 1 shows one embodiment of the recirculation bin 10 of the present invention, which is useful in association with drill tailings handling apparatus 25 as shown in FIG. 2, in the manner hereinafter described.

Figure 3:
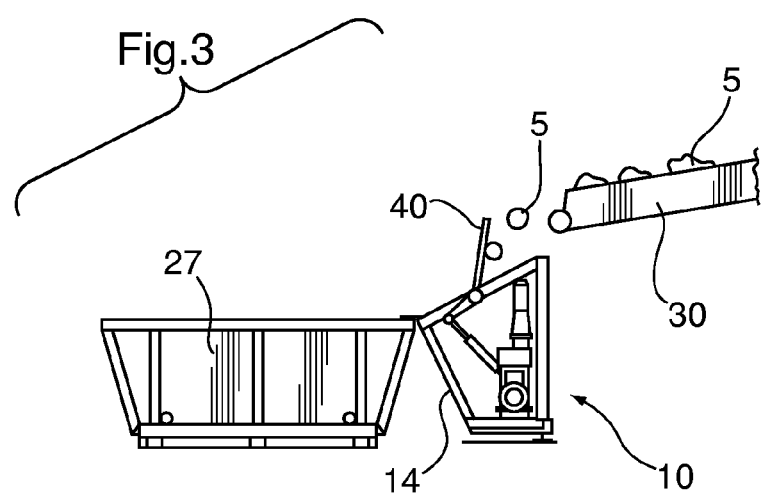
FIG. 3. is a view on arrow "A" of FIG. 2.

In the embodiment of the recirculation bin 10 shown in FIG. 1, such bin, in a preferred embodiment, comprises a substantially rectangular vessel 12, having an inwardly-inclined front side 14, which slopes inwardly from an upper region to a lower region, as best seen in FIG. 3, for the purpose of better directing tailings or drill cuttings 5 to a helical screw auger 16, which is located in a bottom region 4 of the recirculation bin 10, as best shown in FIG. 2, and FIGS. 4-6. Helical auger 16, which is powered by hydraulic, pneumatic, or electrical means 20, is adapted when rotated to deliver drill cuttings 5 (see FIGS. 2,3) which settle to a bottom 18 of recirculation bin 10, to tailings cleaning equipment (not shown) via aperture 22 in recirculation bin 10.

FIG. 2 shows one embodiment of the drill tailings handling apparatus 25 of the present invention, including the recirculation bin 10 of FIG. 1 and FIGS. 4-6. In such embodiment recirculation bin 10 is adapted to be positioned adjacent a generally larger containment bin 27. Recirculation bin 10 may be positioned at one end thereof opposite an open end 28 thereof, as shown in FIGS. 2, 9A, 9B, 11A-11D, and FIG. 12. Alternatively, recirculation bin 10 may be positioned relative to the larger (second) containment bin 27 proximate a mid-region thereof, as shown in FIG. 13, or perpendicularly disposed opposite an open end 28 thereof, as shown in FIG. 14, all for the advantageous purposes as hereinafter described.

Figure 4:
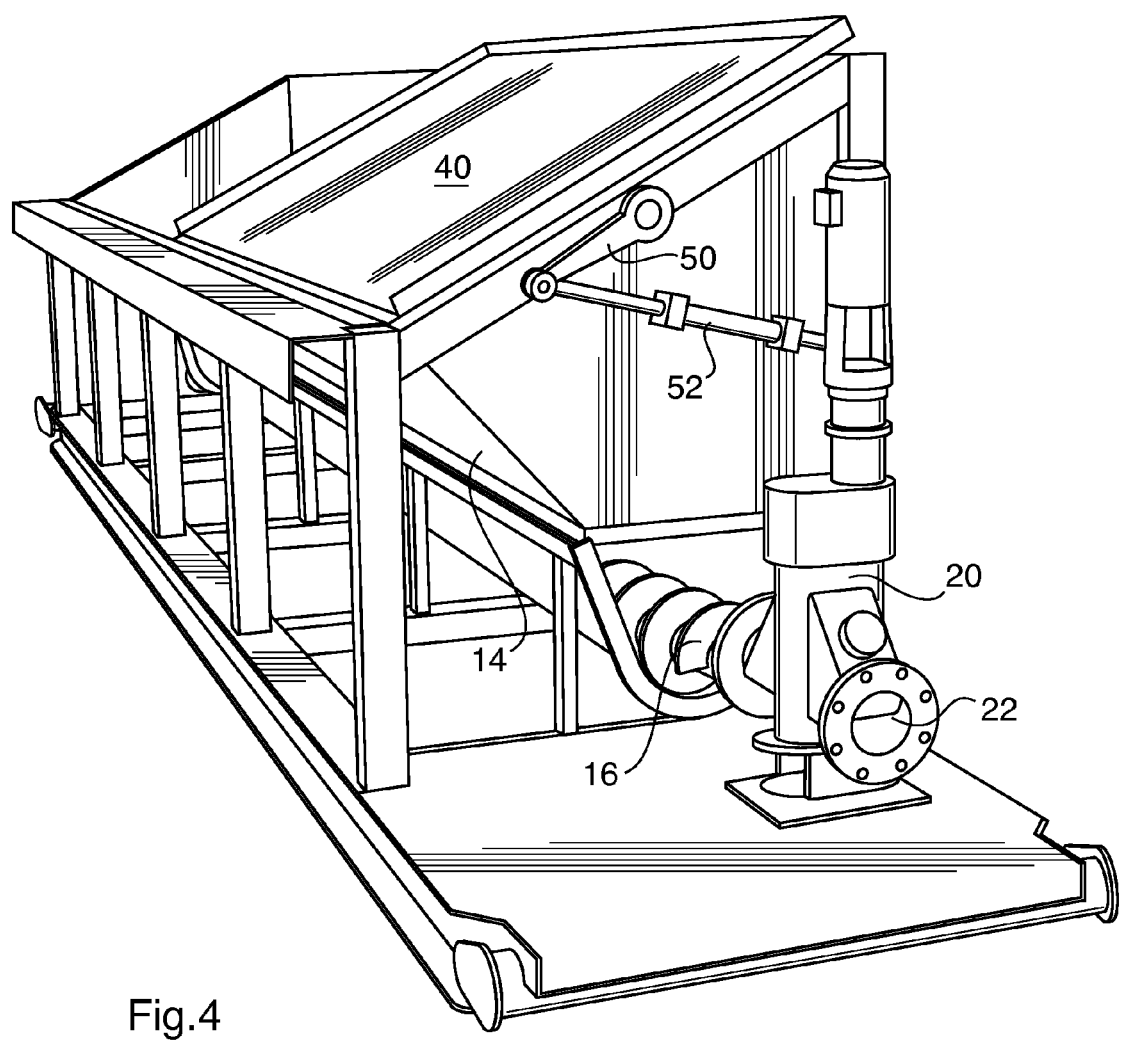
FIG. 4 is a side (partial cut-away) perspective view of another embodiment of the recirculation bin of the present invention, having a single pivotable plate member, adapted for use with only one shaker table or vibratory conveyor, with said plate member shown in the pivoted (closed) position.
Figure 5:
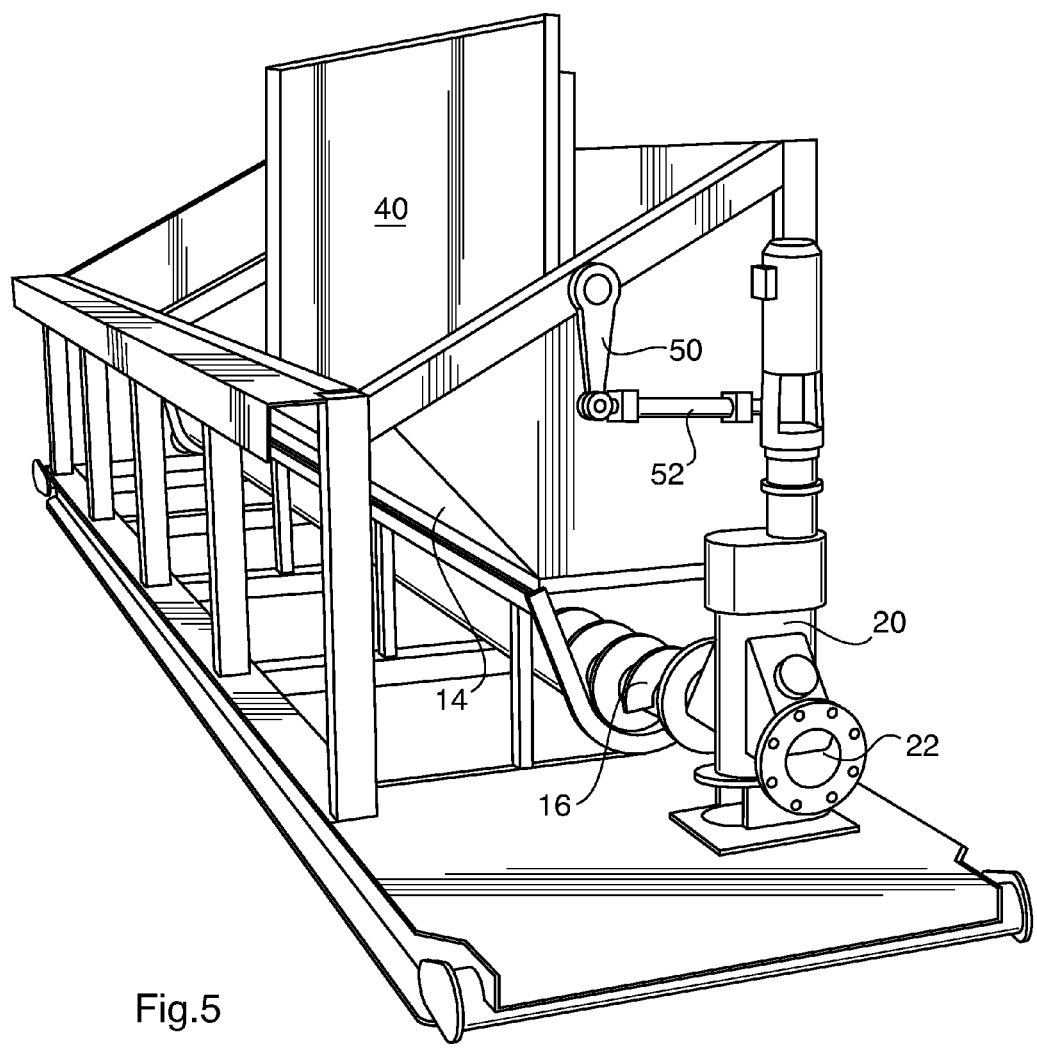
FIG. 5 is a side (partial cut-away) perspective view of the embodiment of the recirculation bin of the present invention, having the single pivotable plate member pivoted to the open position and thereby allowing provision of drill tailings to both the left and right sides of the recirculation bin
Figure 6:
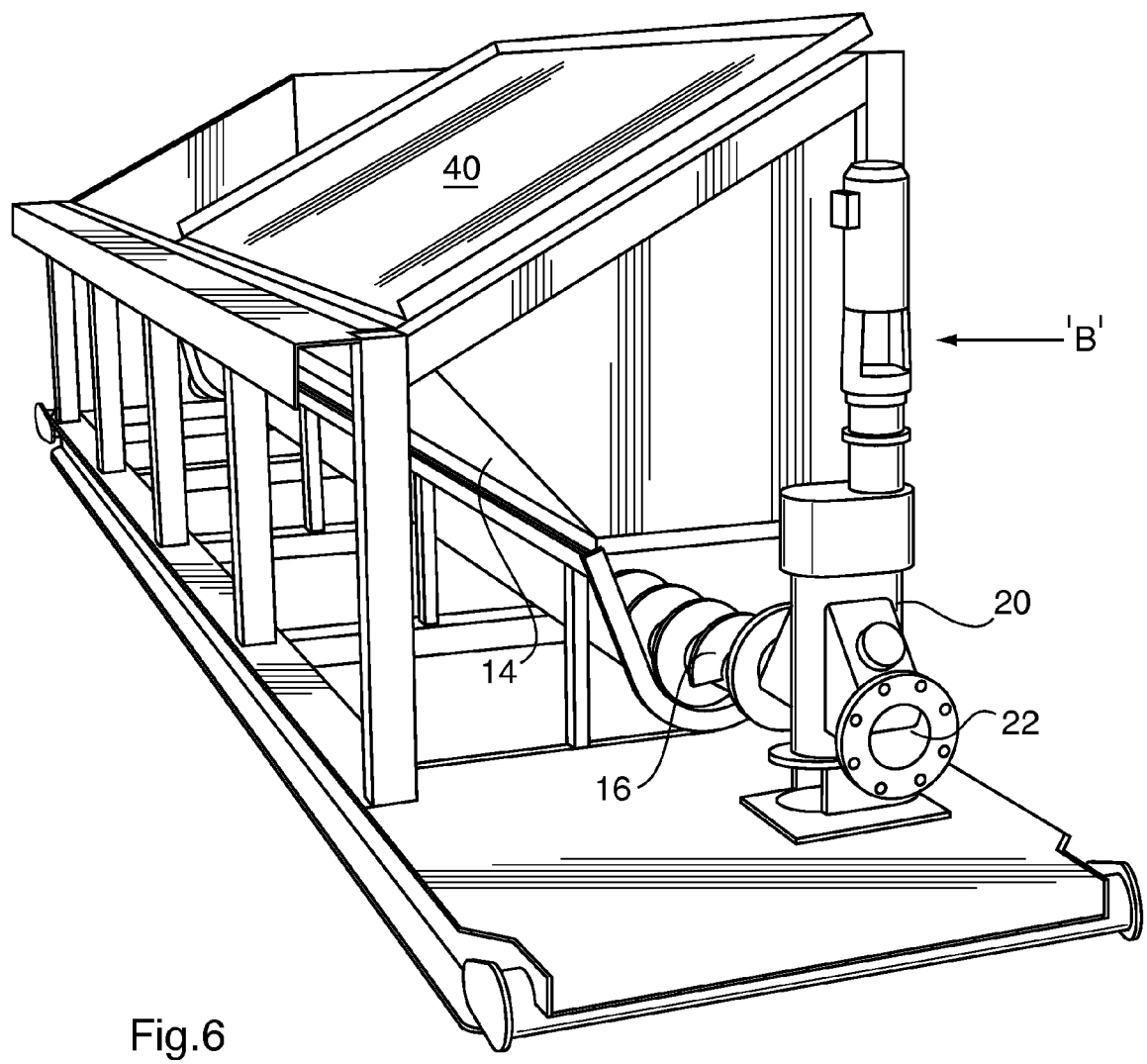
FIG. 6 is a side (partial cut-away) perspective view of a second embodiment of the recirculation bin of the present invention, having a slidable plate member, with said plate member allowing provision of drill tailings to a left side of said recirculation bin, but preventing provision of drill tailings to a right side of said recirculation bin.

In the embodiment shown in FIG. 2, drill tailings 5 produced and emanating from a drilling derrick (not shown) are delivered by two(2) shaker tables 30 (typically vibratory conveyors-only a portion of which being shown in FIG. 2) to recirculation bin 10. Recirculation bin 10, as shown in the embodiment shown in FIGS. 1 & 2, is provided with a pair of independently rotatable pivotable plate members 40a, 40b, each pivotable about a rotational axis 42, which axis 42 in a preferred embodiment passes through a center of gravity 44 of each plate member 40 in order to reduce the force needed to rotate plate member about rotational axis 42. In an embodiment where only one shaker table 30 is used to provide drill tailings 5 (eg FIGS. 9A, 9B), recirculation bin 10 need only possess one pivotable plate member 40, as shown in FIGS. 4 & 5.

In the embodiment shown in FIG. 2, left pivotable plate member 40a is pivoted in the "open" position, so as to allow delivery of drill tailings 5 to the interior of recirculation bin 10, and thence to auger 16 and thereafter to tailings cleaning equipment (not shown) via aperture 22 in recirculation bin 10. In contrast, right plate member 40b is shown in the closed position, thereby temporarily diverting a portion (approximately ½ of drill tailings 5, if the delivery rate of tailings 5 from each of shaker tables 30 is approximately equal) delivered to recirculation bin 10 is approximately equal. In such manner the flow rate of tailings to recirculation bin 10 may be reduced, (or indeed even stopped if both plate members 40a, 40b are rotated to the "closed" position) in order to allow cleaning equipment (not shown) to "catch up" during periods when the drilling derrick (not shown) may be shut down for servicing or when tailings are less dirty and can be processed (ie cleaned) quicker.

In the preferred embodiment plate members 40a, 40b (collectively referred to hereinafter as plate members 40) may be individually rotated by powered means, such as a hydraulic piston 20 provided on each side of bin 10, which piston 20 is coupled to a lever arm 50 and when extended or contracted causes rotation of plate members 40 about rotational axis 44.

Advantageously, due to the proximity of second container bin 27 to recirculation bin 10, deflected drill tailings which are deflected and prevented from entering bin 10 will be deflected into second container bin 27. Thereafter, due to second containment bin 27 being open at one end 28 and of a sufficient width to allow entrance of a front-end loader vehicle (not shown), a front-end loader can then enter second container bin 27, scoop up drill tailings 5 therein, and when one or both of plate members 40 are pivotably rotated by hydraulic piston 52 and lever arm 50 to an open position, re-deliver such scooped-up excess drill tailings 5 to recirculation bin 10 at a time when the capacity of the tailings cleaning apparatus (not shown) may then be better able to handle such tailings 5 for cleaning.

As shown in FIGS. 4 & 5, where the drill tailings handling apparatus comprises only a single shaker table, the recirculation bin 10 may simply comprise a single plate member 40, which may extend to rotatably cover an entire top surface of recirculation bin 10, or only a portion thereof, as shown in FIGS. 4 & 5.

Figure 7:
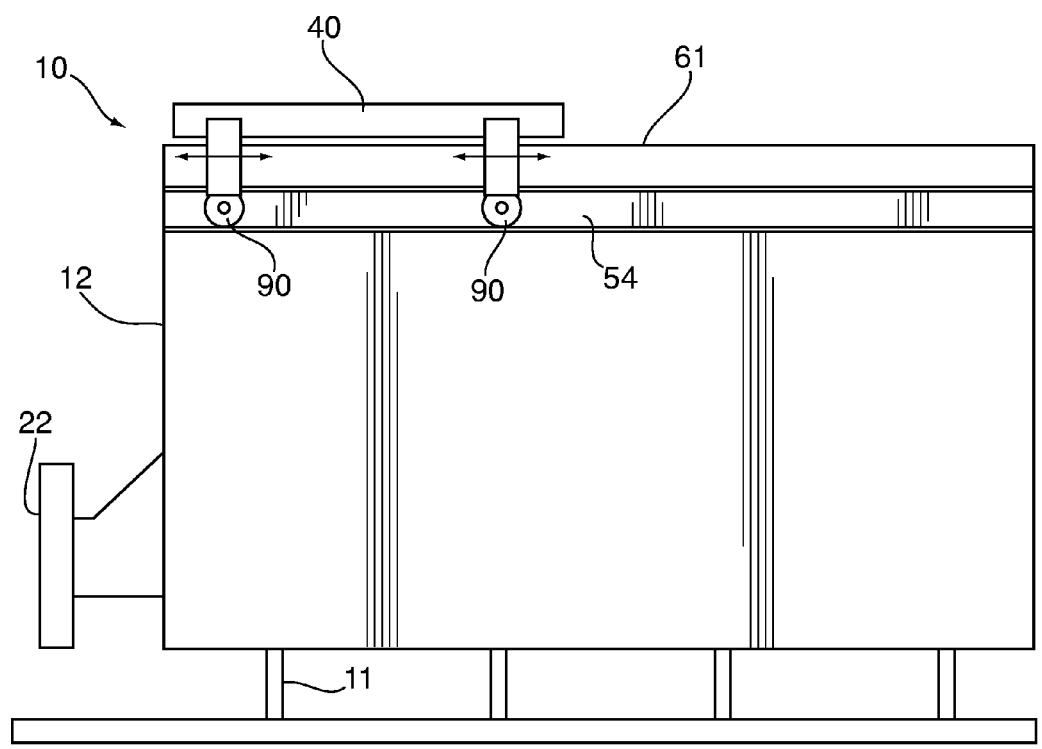
FIG. 7 is a rear view of the recirculation bin shown in FIG. 6.
Figure 8:
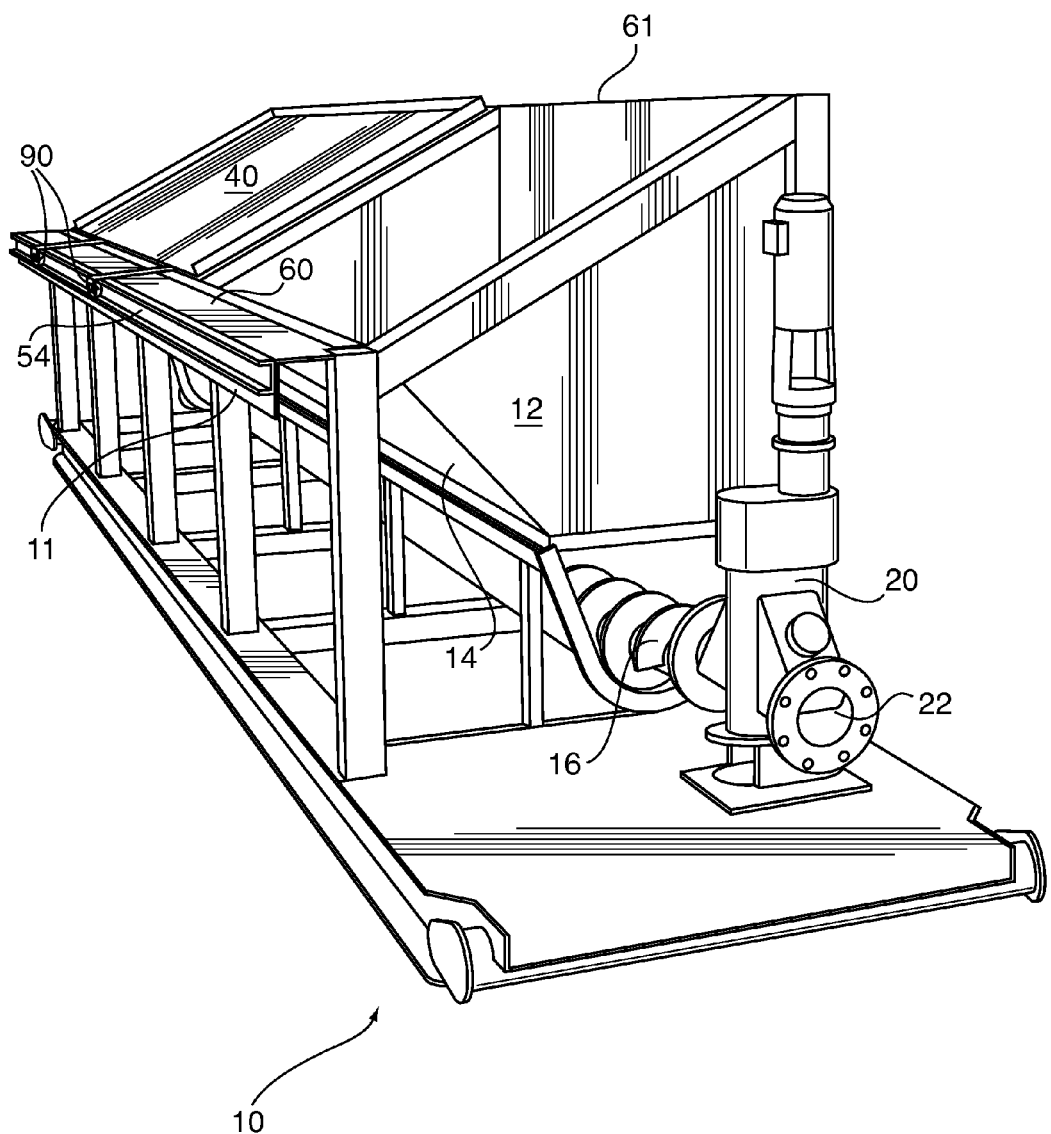
FIG. 8 is a side perspective view of a third embodiment of the recirculation bin of the present invention, having a slidable plate member (deflector)) slidable to respectively cover or uncover a right top side of said recirculation bin.
Figure 9A:
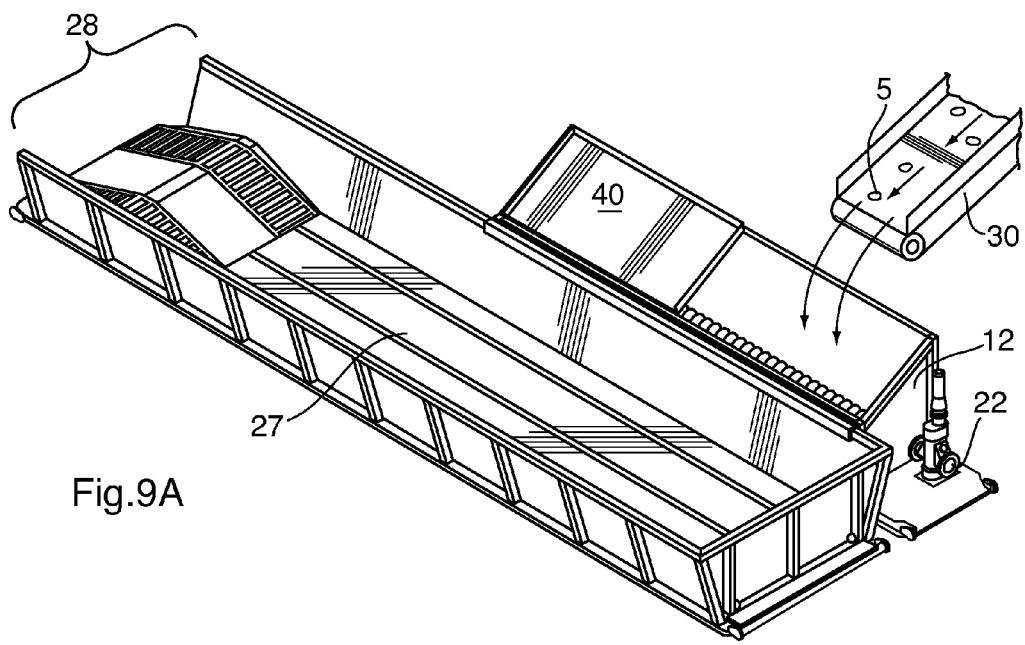
FIG. 9A is a perspective view of a second embodiment of a drill tailings handling apparatus of the present invention, employing the recirculation bin of FIG. 8 and employed where only one shaker conveyor is used, with the plate member on the recirculation bin positioned in a position to allow provision of tailings to a right had side of the recirculation bin.
Figure 9B:
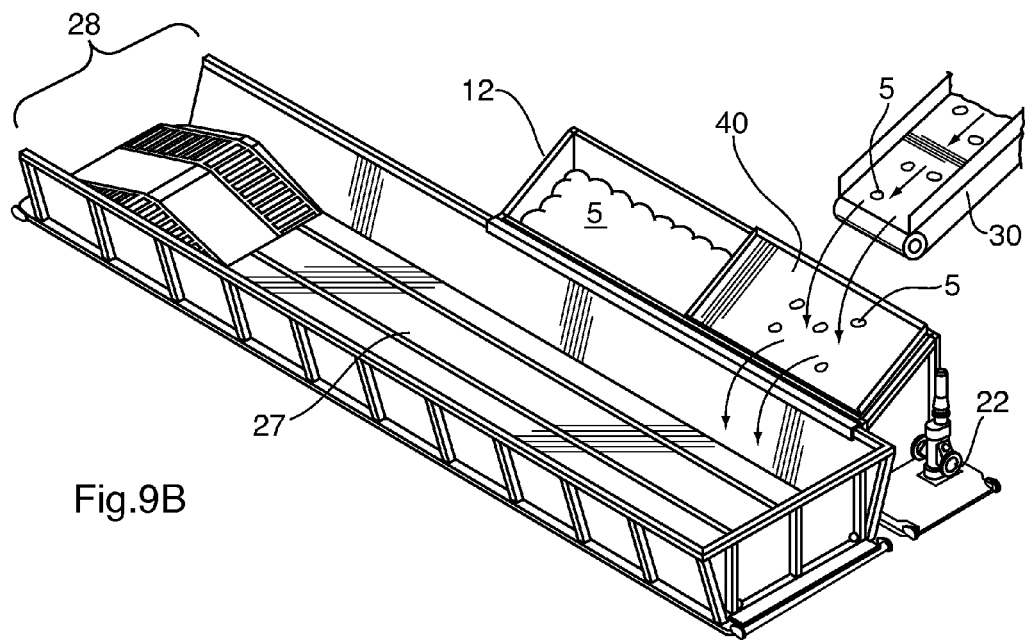
FIG. 9B is a view of the same drill tailings handling apparatus of FIG. 8, with the plate member on the recirculation bin repositioned to prevent further drill tailings from being supplied to the recirculation bin and instead diverting such drill tailings to a second container which accessible at one end by a front-end loader.
Figure 10:
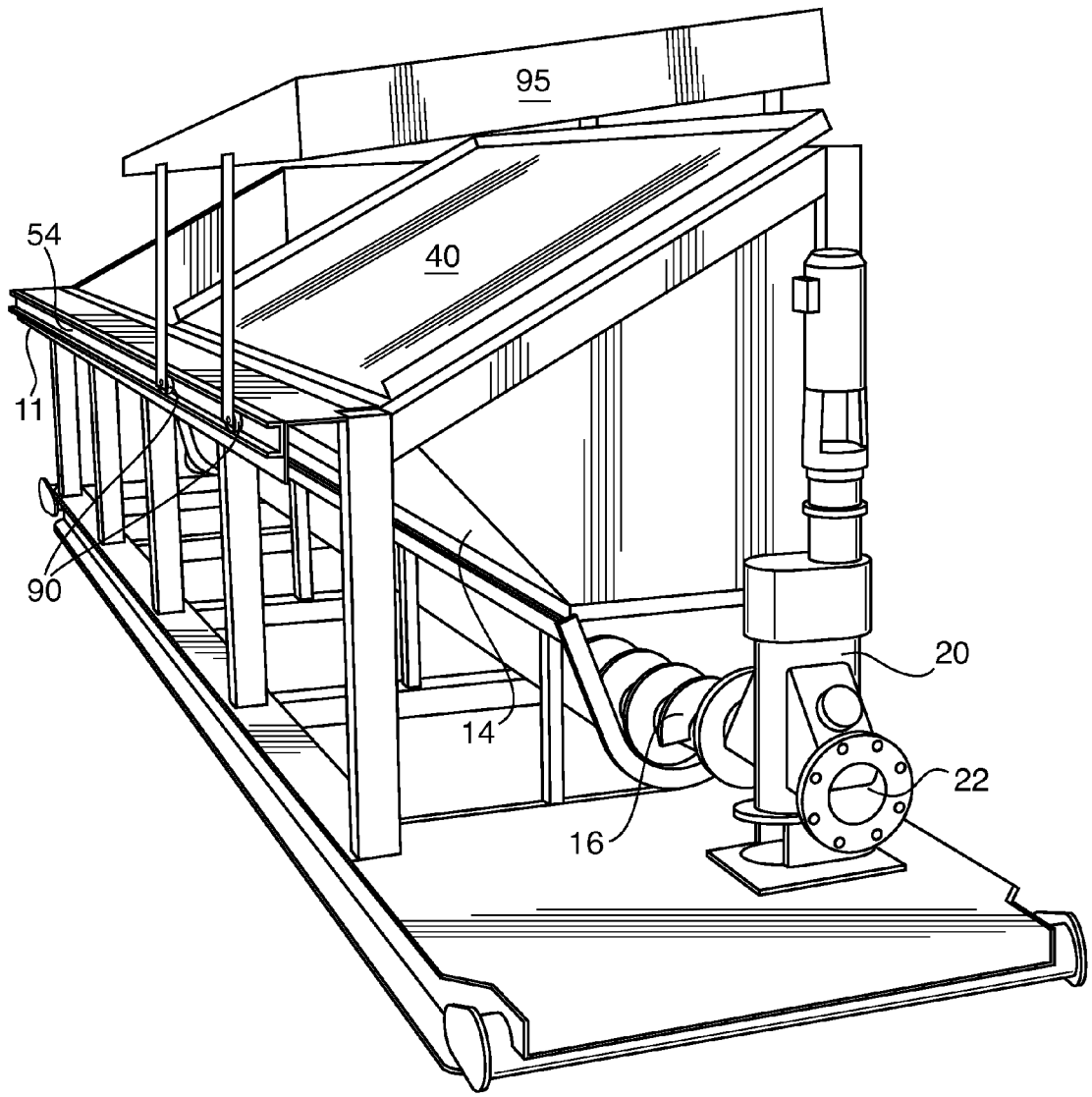
FIG. 10 is a side perspective view of a fourth embodiment of the recirculation bin of the present invention, having a pair of independently moveable slideable deflector plates.

FIGS. 6-9B show a further alternative embodiment of the recirculation bin 10, wherein the plate member 40 covers, in the "closed" position, approximately ½ of the length of the recirculation bin 10, and is slidably coupled to frame 11 of bin 10 in one of the various manners more fully described below, so as to permit slidable movement from a left hand side to a right hand side of bin 10, as shown in FIGS. 9A & 9B, so as to, when closed, deflect a stream of drill tailings 5 from shaker table 30 to second container bin 27 (FIG. 9B), or when "open" to allow delivery of drill tailings 5 to an interior of recirculation bin 10 (FIG. 9A).

In the embodiment of bin 10 shown in FIGS. 6-9B, plate member 40 may be slidably coupled to recirculation bin 10 via a pair of roller wheels 90 which pass along a grooved track 54, located on a front top edge 60 and rear top edge 61 of recirculation bin 10, as shown in FIGS. 8 & 7 respectively. Other means of slildeably engaging plate member 40 to frame 11 of bin 10 may be used, and many other means will now occur to a person of skill in the art.

In a further embodiment of the recirculation bin 10 of the present invention, as shown in FIGS. 10 & 11A-11D, such bin 10 possesses an upper plate member 95, and a lower plate member 40.

Upper plate member 95 is sloped so as to direct drill tailings 5 from one side of recirculation bin 10 to another. Lower plate member 40, while also sloped, is sloped in a direction disposed 90° to the direction in which plate member 95 is sloped, with plate member 40 sloped in a direction to deflect drill tailings which land on plate member 40 into second container 27 so as to prevent such drill tailings 5 from entering recirculation bin 10.

Each of upper plate member 95 and lower plate member 40 are independently slideable, so as to alternatively permit coverage of a left half, or a right half, of recirculation bin 10, with four(4) various permutations shown in FIGS. 11A to 11D being obtainable.

Figure 11A:
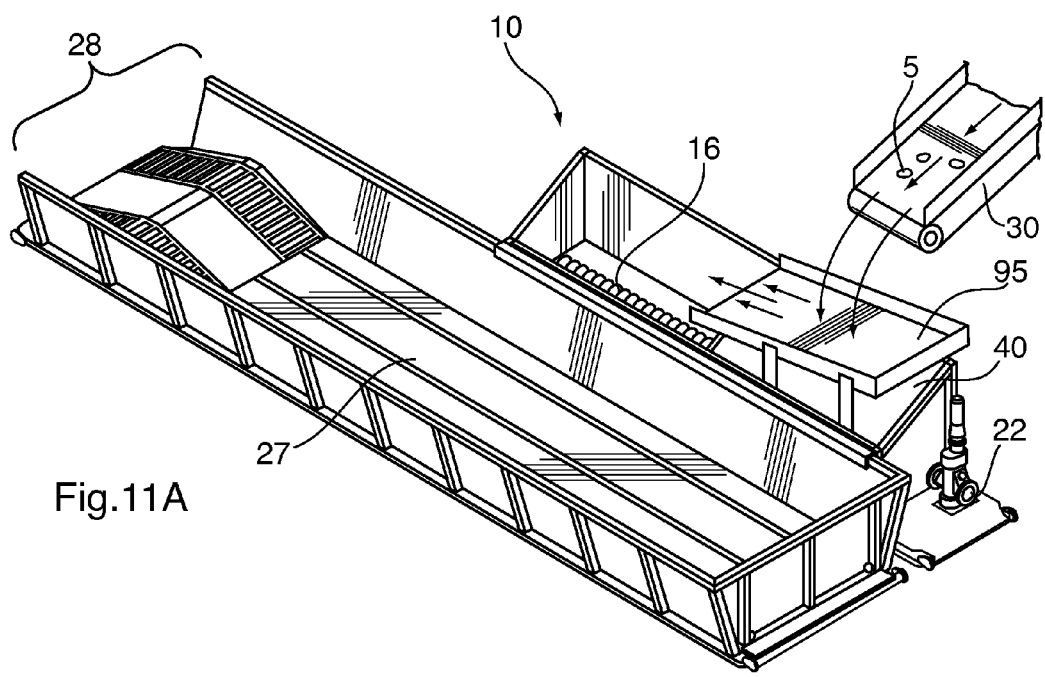
FIG. 11A is the first of a series of four (4) views of the recirculation bin of FIG. 10, with the upper deflector plate positioned on a right-hand side of the recirculation bin and positioned above the lower deflector plate, adapted to deflect tailings into a left-hand side of the recirculation bin.

Specifically, in the embodiment shown in FIG. 11A, upper plate member 95 is disposed above lower plate member 40, and both are slidably positioned, in the matter disclosed for a single slidable plate member or as may now occur to persons of skill in the art, on the right-hand side of retainer bin 10. In such manner drill tailings 5 delivered to recirculation bin 10 by shaker table 30 will be deflected by upper plate member 95 to the left hand side of recirculation bin 10, and via auger 16 may thereafter be delivered to cleaning equipment (not shown) for cleaning.

Figure 11B:
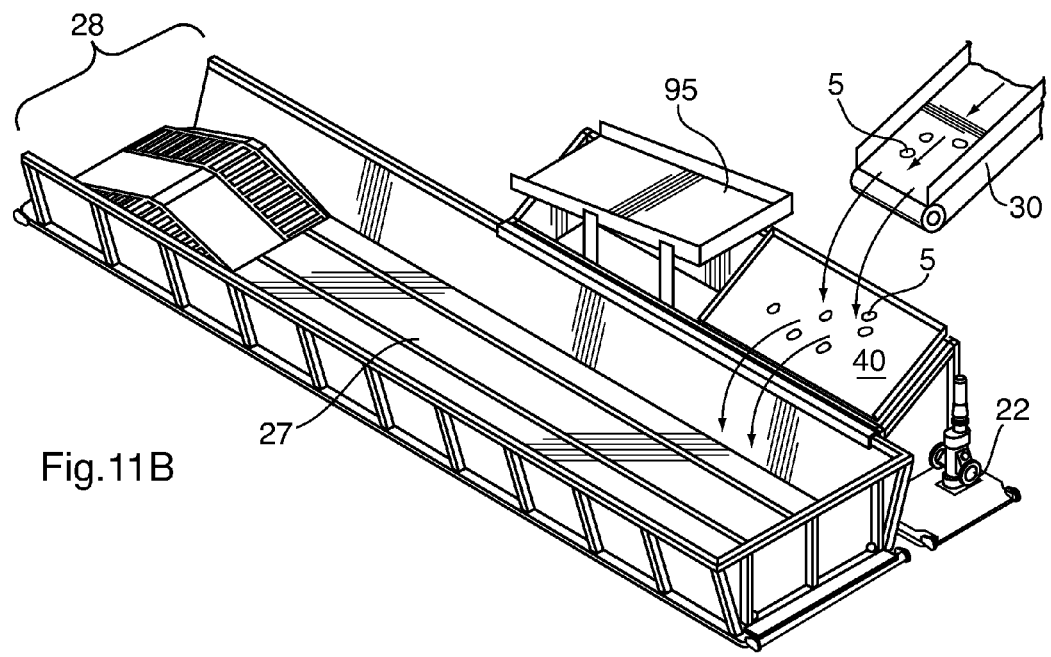
FIG. 11B is the second of a series of four (4) views of the recirculation bin of FIG. 10, with the upper deflector plate positioned on a left—hand side of the recirculation bin, and the lower deflector plate positioned on the right-hand side of the recirculation bin, wherein the recirculation bin is then adapted to deflect drill tailings into the second adjacent container.
Figure 11C:
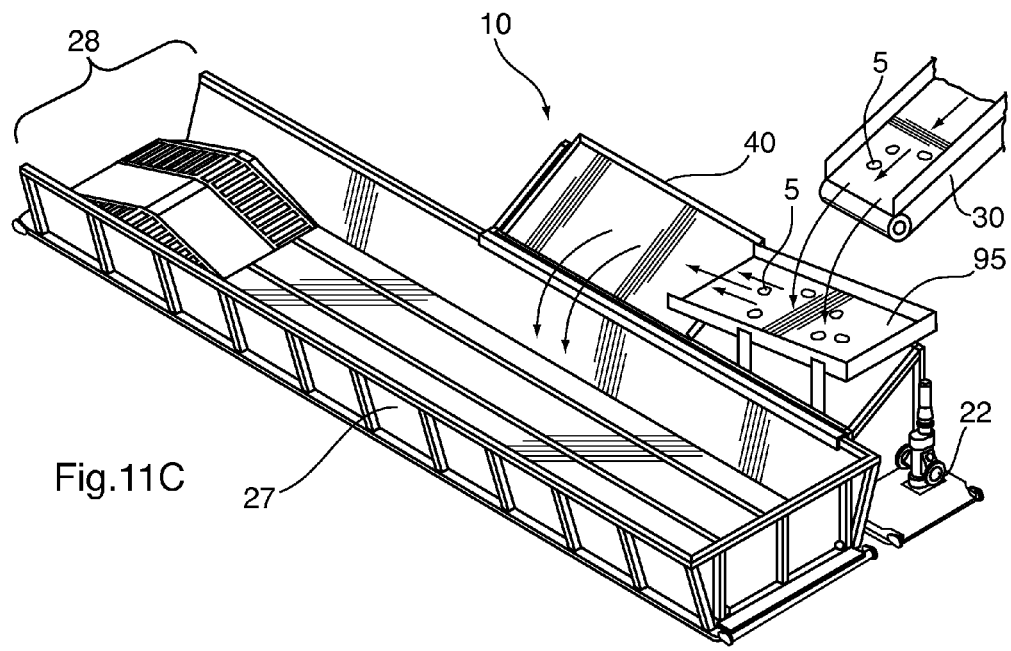
FIG. 11C is the third of a series of four (4) views of the recirculation bin of FIG. 10, with the upper deflector plate positioned on the right-hand side of the recirculation bin, and the lower deflector plate positioned on the left—hand side of the recirculation bin, wherein the recirculation bin is then adapted to deflect drill tailings into the second adjacent container at a different location than depicted in FIG. 11B.

In the embodiment shown in FIG. 11C, lower plate member 40 may be slidably repositioned from the right-hand side of bin 10 to the left-hand side of bin 10, where it receives drill tailings 5 delivered from upper plate member 95, and deflects such tailings 5 into a mid-region of second container 27.

Figure 11D:
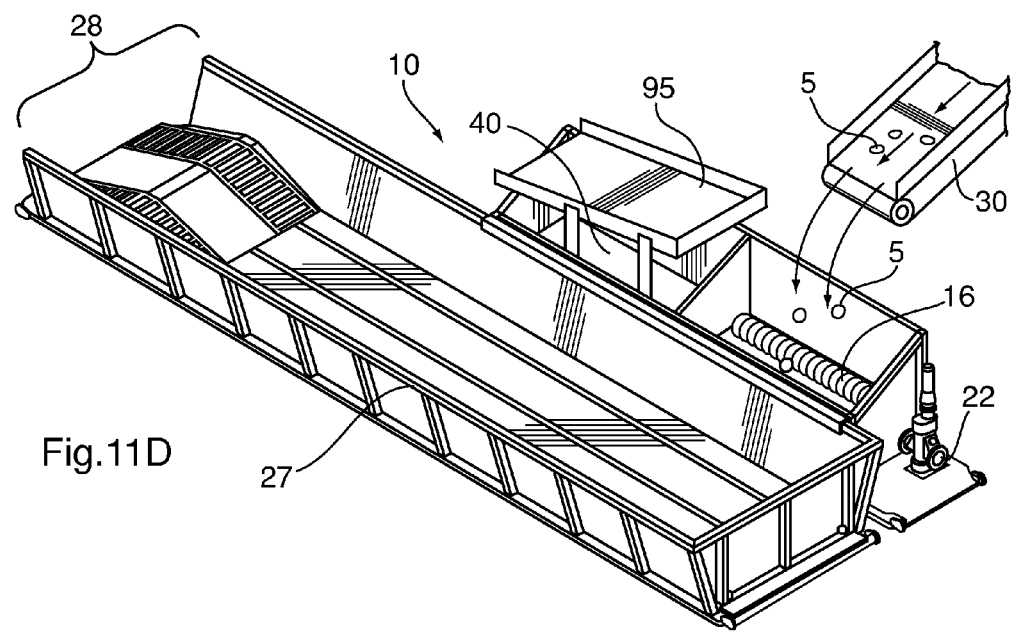
FIG. 11D is the fourth of a series of four (4) views of the recirculation bin of FIG. 10, with the upper deflector plate positioned on the left-hand side of the recirculation bin, and the lower deflector plate similarly positioned on the left—hand side of the recirculation bin beneath the upper deflector plate, wherein the recirculation bin is then adapted to accept drill tailings into the right-hand side thereof.

In the embodiment shown in FIG. 11D, each of upper plate member 95 and lower plate member 40 may be positioned on the left-hand side of recirculation bin 10, thereby allowing shaker table 30 to deliver drill tailings to the interior of recirculation bin 10.

In the particular permutation of arranging plate members 95, 40 shown in FIG. 11B, lower plate member 40 may be positioned over the right-hand side of recirculation bin 10, with upper plate member 95 remaining on the left-hand side of recirculation bin 10, thereby permitting lower plate member 40 to deflect drill tailings, in an "overflow" situation, to an end of second container 27 opposite open end 28.

Advantageously, in an "overflow" condition, plate members 40, 95 may be consecutively positioned in the configurations shown in FIGS. 11B & 11C, to uniformly distribute excess drill tailings within second container 27, thereby permitting greater filling of second container 27 without spillage.

Similarly, and equally advantageously, in an "underflow" or "sufficient capacity" situation, plate members 40, 95 may be consecutively positioned in the configurations shown in FIGS. 11A & 11D, to thereby permit uniform distribution of drill tailings within recirculation bin 10, thereby permitting greater filling of recirculation bin 10 without spillage, for subsequent delivery to cleaning apparatus.

The foregoing description of the disclosed embodiments is provided to enable any person skilled in the art to make or use the present invention. Specifically, various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more".

Moreover, no element of any of the claims appended to this application is to be construed under the provisions of 35 USC §112, sixth paragraph, unless the claim element is expressly recited using the exact phrase "means for" or "step for".

For a complete definition of the invention and its intended scope, reference is to be made to the summary of the invention and the appended claims read together with and considered with the disclosure and drawings herein.

I claim:

1. A recirculation bin for drill tailings, comprising:
   (i) a container for drill tailings comprising a bottom wall and side walls;
   (ii) helical auger means, situated in an interior of said container proximate said bottom wall and substantially spanning a lower region of said interior of said container, adapted for transporting tailings which settle in said lower region of said container out of said container; and
   (iii) a moveable plate member, slidably engaged with or pivotably coupled to said container, moveable from a first position for diverting tailings, to a second position allowing tailings to enter said interior of said container.

2. The recirculation bin for drill tailings as claimed in claim 1, wherein said moveable plate member is moveable from said first position, said first position being a closed position for preventing said tailings from entering said interior of said container and diverting said tailings away from said container, to said second position, said second position being an open position allowing tailings to enter said interior of said container.

3. The recirculation bin for drill tailings as claimed in claim 2, wherein said moveable plate member is slideably moveable along top edges of said container, from said first position, to said second position.

4. The recirculation bin for drill tailings as claimed in claim 2, wherein said moveable plate member is pivotably coupled to said container and is pivotably moveable from said first position, to said second position.

5. The recirculation bin for drill tailings as claimed in claim 2, 3, or 4, wherein said plate member, when in said first position, presents an inclined surface.

6. The recirculation bin for drill tailings as claimed in claim 5, wherein said plate member's inclined surface, when said plate member is in said first position, diverts tailings from one side of said container to another.

7. The recirculation bin for drill tailings as claimed in claim 5, wherein said plate member's inclined surface, when said plate member is in said first position, prevents said tailings from falling into said interior and instead diverts said tailings away from said container.

8. The recirculation bin for drill tailings as claimed in claim 3, wherein said plate member is slidably moveable by powered means along a top surface of said container, between said first position to said second position.

9. The recirculation bin for drill tailings as claimed in claim 4,
   said plate member having an axis of rotation; and
   wherein said plate member is pivotable about said axis of rotation.

10. The recirculation bin for drill tailings as claimed in claim 9, wherein said axis of rotation passes through a centre of gravity of said plate member.

11. The recirculation bin for drill tailings as claimed in claim 2, 3, or 4, wherein said recirculation bin has a substantially rectangular-shaped top surface, and said plate member spans substantially a width of said top surface but only a fraction of a length of said top surface.

12. The recirculation bin for drill tailings as claimed in claim 2, 3, or 4, wherein said recirculation bin has a substantially rectangular-shaped top surface, and said plate member spans substantially a width of said top surface but only approximately ½ of a length of said top surface.

13. The recirculation bin for drill tailings as claimed in claim 1, wherein at least one of said bottom or side walls has an inclined surface which extends from an upper region to a lower region of said container, and said auger means is located in said lower region, said inclined surface adapted to ensure tailings within said recirculation bin which fall or slide from said upper region to said lower region by gravity are directed toward said auger means.

14. The recirculation bin for drill tailings as claimed in claim 13, wherein at least one of said side walls has an inwardly-inclined surface which is inwardly inclined from an upper region to a lower region of said container, and said auger means is located in said lower region, said inclined surface adapted to ensure tailings within said recirculation bin which fall or slide from said upper region to said lower region by gravity are directed toward said auger means.

15. A recirculation bin apparatus for drill tailings, comprising:
   (i) a first container for receiving drill tailings, comprising a bottom wall and side walls;
   (ii) helical auger means, situated in an interior of said first container proximate said bottom wall and substantially spanning a lower region of said interior of said container, adapted for transporting tailings which settle in said lower region of said container out of said first container;
   (iii) a first moveable plate member, slidably engaged with said first container, having an inclined surface, moveable from a first position for diverting tailings from a first side of said first container to a second side of said first container, to a second position for allowing tailings to enter said interior of said first container via said first side of said first container; and
   (iv) a second moveable plate member, slidably engaged with said first container, having an inclined surface, slidable from a first position for diverting tailings from a first side of said first container away from said first container, and a second position for allowing tailings to enter said interior of said first container via said first side of said container.

16. An apparatus for handling drill cuttings during cleaning operations, comprising:
   (i) the recirculation bin as claimed in claim 1;
   (ii) a second rectangular container, positionable adjacent said container of said recirculation bin and adapted to receive drill tailings from said container of said recirculation bin which have been deflected by said moveable plate member when said container of said recirculation bin is full or is unable to deliver said drill tailings at a sufficient rate to downstream processing equipment;
   wherein said second container is open at one end thereof to allow entry of a front-end loader vehicle therein; and
   wherein said moveable plate member of said recirculation bin is moveable from said first position in which it directs and/or deflects drill tailings to said second container, to said second position so as to allow said first container to receive and retain drill cuttings that are delivered to said first container.

17. . The apparatus as claimed in claim 16, wherein said moveable plate member is pivotably coupled to said container of said recirculation bin and moveable from said first position, said first position being a closed position for preventing said tailings from entering said interior of said container of said recirculation bin and diverting said tailings from said container of said recirculation bin to said second container, to said second position in which tailings are permitted to enter said container of said recirculation bin.

18. . The apparatus as claimed in claim 16, wherein said moveable plate member is slideably engaged with said container of said recirculation bin and moveable from said first position, said first position being a closed position for preventing said tailings from entering said interior of said container of said recirculation bin and diverting said tailings from said container of said recirculation bin to said second container, to said second position in which tailings are permitted to enter said container of said recirculation bin.

19. The apparatus as claimed in claim 16 wherein said container of said recirculation bin is rectangular.

20. An apparatus comprising a recirculation bin, the recirculation bin comprising:
   (i) a container for drill tailings comprising a bottom wall and side walls;
   (ii) helical auger means, situated in an interior of said container proximate said bottom wall and substantially spanning a lower region of said interior of said container, adapted for transporting tailings which settle in said lower region of said container out of said container; and
   (iii) a moveable plate member, slidably engaged with or pivotably coupled to said container, moveable from a first position for diverting tailings, to a second position allowing tailings to enter said interior of said container.

* * * * *